United States Patent
Takagi

(10) Patent No.: US 6,487,619 B1
(45) Date of Patent: Nov. 26, 2002

(54) MULTIPROCESSOR SYSTEM THAT COMMUNICATES THROUGH AN INTERNAL BUS USING A NETWORK PROTOCOL

(75) Inventor: Hitoshi Takagi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/417,643

(22) Filed: Oct. 14, 1999

(51) Int. Cl.$^7$ .............................. G06F 13/00; G06F 9/00
(52) U.S. Cl. ............................ 710/105; 710/8; 709/221
(58) Field of Search ........................... 710/105, 8, 305, 710/313, 316; 709/221, 305, 301, 253, 238, 250, 220; 714/4; 370/386; 340/825

(56) References Cited

U.S. PATENT DOCUMENTS

| | | | |
|---|---|---|---|
| 4,412,285 A | * | 10/1983 | Neches et al. |
| 5,191,652 A | * | 3/1993 | Dias et al. |
| 5,950,228 A | * | 9/1999 | Scales et al. |
| 6,000,003 A | * | 12/1999 | Allen et al. |
| 6,330,715 B1 | * | 12/2001 | Razzaghe-Ashrafi |

OTHER PUBLICATIONS

Hennessy et al.; "Computer Architecture: A Quantitative Approach"; $2^{nd}$ Edition; Morgan Kaufmann; 1996; pp. 563–641.

* cited by examiner

Primary Examiner—Gopal C. Ray
(74) Attorney, Agent, or Firm—Foley & Lardner

(57) ABSTRACT

A multi-processor computer system includes a plurality of computing cells, each of which include a processor, a memory and an interface unit. An interconnect device connects the computing cells. Each of the computing cells are provided with a network driver for the interconnect device so that the computing cells can communicate with each other by using a network protocol.

12 Claims, 14 Drawing Sheets

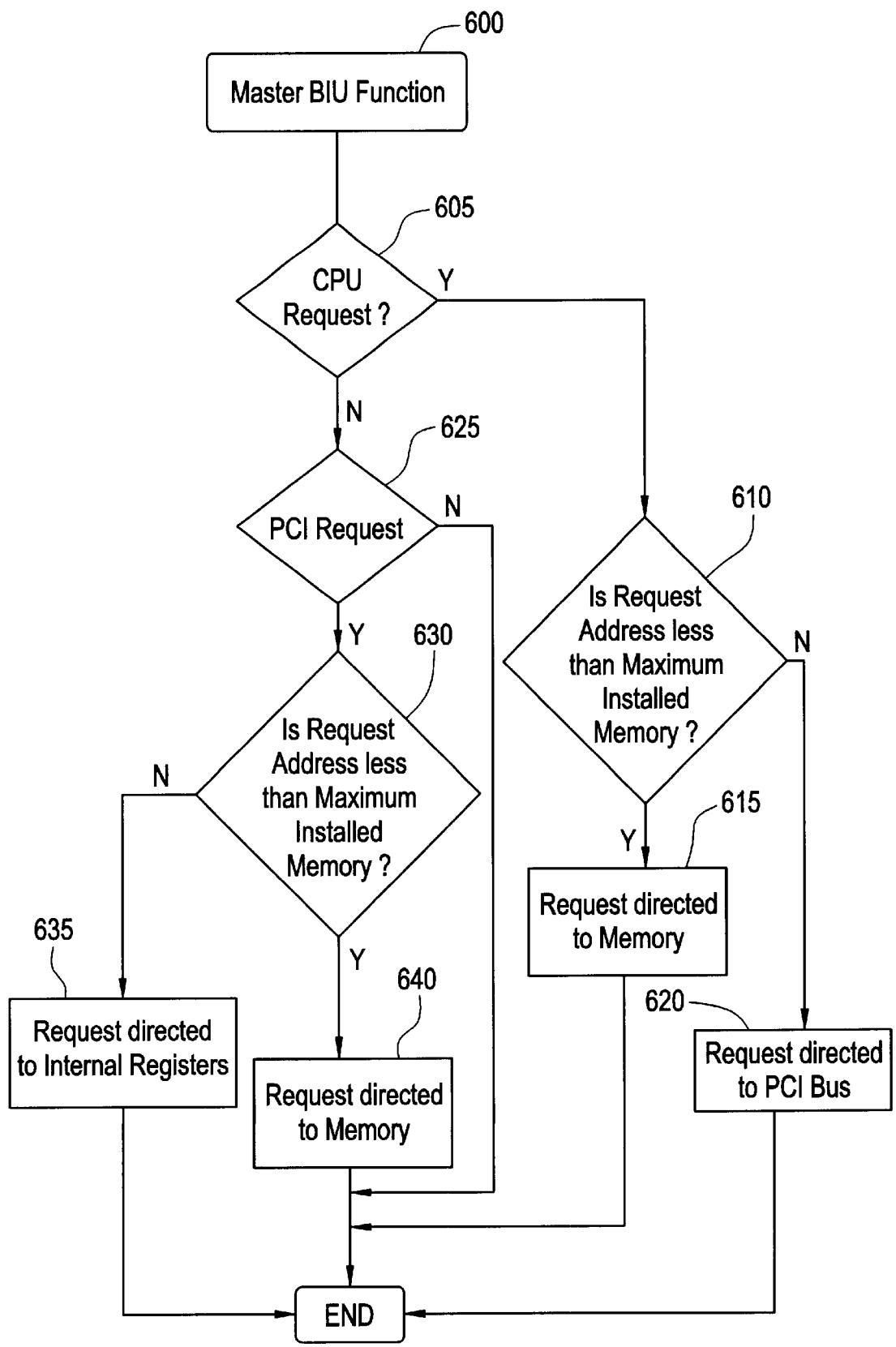

MULTIPROCESSOR SYSTEM THAT COMMUNICATES THROUGH AN INTERNAL BUS USING A NETWORK PROTOCOL

BACKGROUND OF THE INVENTION

1. Field of the Invention

This invention relates generally to the field of multiprocessor systems, and more particularly to a multiprocessor system in which the processors communicate with each other through an internal bus or another interconnect device by using a network protocol.

2. Description of the Related Art

In a network computing environment, user application programs communicate by using a network application layer protocol. For example, an electronic mail(e-mail) program on a desktop system (a client machine) communicates with a mail server program on server computers by using a mail transfer protocol such as the Post Office Protocol(POP) or the Simple Mail Transfer Protocol(SMTP). In another example of a networked application system, a web browser communicates with web servers by using the Hyper Text Transfer Protocol (HTTP).

The application programs communicate with the network through certain Application Program Interfaces (APIs), such as, the Sockets API to the TCP/IP system, or the NetBIOS and the TLI (Transport Layer Interface) APIs. Under an API, there are layers of various protocol stacks which ensure that data between programs are transferred in order, without loss of data or other errors. Examples of such protocol stacks are TCP/IP, SPX/IPX and NetBEUI. These protocols are respectively implemented by a collection of programs called network drivers.

Under the network drivers, there are the hardware drivers which actually control the appropriate hardware to transfer data from one networked location to another. These hardware drivers, and the corresponding hardware, are implemented using standard specifications such as the Ethernet (IEEE 802.3), Asynchronous Transfer Mode (ATM), Token Ring (IEEE 802.5), and other Wide Area Networking (WAN) standards such as the Integrated Subscriber Digital Network (ISDN), X.25, Frame relay, Digital Subscriber Line (DSL), Asynchronous Digital Subscriber Lines (ADSL) and the like. Finally, computers re physically connected by cables which generally conform with at least one of these standards.

Network interface hardware is generally provided inside a computer. For example, there may be an ethernet hardware component, such as an ethernet card, which is attached to an I/O(Input/Output) bus of the computer. Such an ethernet card may be made by a vendor such as Intel Corporation. In another example, a computer may have two ethernet cards attached to an I/O bus, where one of the cards is made by Intel and the other card is made by another vendor, such as Compaq Corporation. In the latter situation, the lowest layer of the network driver discriminates which hardware card can be used by referring to the computer's configuration and the request made by the application program.

FIGS. 1a and 1b provide examples of networking layers in a distributed application system. FIG. 1a shows application programs 10 invoking the services of a transport independent API 11, such as the Sockets, TLI, CPI/C or the Named Pipes API. These API's provide access to the implementations of the various networking transport protocols 12 such as the TCP/IP, SNA, IPX/SPX, or NetBIOS. Layered beneath the implementations of the transport protocols 12 are the logical network drivers 13 which are accessible by standard interfaces such as the NDIS or the ODI interfaces. The logical network drivers interact with the hardware 14 that are implemented using standard specifications such as the Token Ring, Ethernet or the ISDN specifications.

FIG. 1b shows how the layers of the commonly used networking software map to the seven logical layers of the OSI reference model which has the application layer 15 at the top providing the interface for the application programs. The physical layer 21 at the bottom defines the specifications for the networking hardware and media. The intermediate layers of the OSI model include the presentation layer 16, the session layer 17, the transport layer 18, the network layer 19 and the logical link layer 20.

An example that discusses the layers underlying the communication of an internet web browser (such as Internet Explorer or Netscape Navigator) with an internet web server is illustrative. As shown in FIG. 2, an internet web browser 22 communicates with an internet web server by using the HTTP application layer protocol. To communicate by HTTP, a browser must use a lower level protocol, such as the TCP/IP protocol, to ensure that all the data transmitted is delivered in order, without errors or loss of data.

A TCP/IP implementation provides an API (Application Program Interface) 23, called Sockets API, for invoking the services of the TCP/IP software. Therefore, the API is a way for the application programs to invoke the services of the network drivers 24. Network driver software 24 must also be provided to implement the TCP/IP protocol. These network drivers 24 in turn invoke hardware drivers 25, by calling library routines such as read, write, and ioctl to transfer, receive, or control information from a network. Network drivers 24 are provided configuration information of the networking hardware 26 by the operating system, such as whether an ethernet adapter or an ATM adapter is provided in the computer.

Therefore, transferring data between one machine and another primarily includes the basic (or primitive) "send" operation. Accordingly, a primitive operation of the hardware driver to invoke this functionality is a SEND command (or function call) which is provided by the hardware driver to cause the networking hardware to send the provided data across the network. Likewise, the primitive operation of READ causes the hardware driver to read data from the network.

Examples of a conventional multiprocessor system is described in a text titled "Computer Architecture: A Quantitative approach," John Hennessy and David Patterson, $2^{nd}$ edition, Morgan Kaufman, 1996. A first example described in the text is illustrated with reference to FIG. 3, which shows a generic interconnection network 30 connecting the nodes 31 of a parallel processing computer system. For example, a Massively Parallel Processor (MPP) can interconnect thousands of nodes 31 with a very short maximum distance, often less than 25 meters.

With reference to FIG. 4, which discusses a second example from the text, a distributed memory machine is shown. The distributed memory machine consists of individual nodes 33 containing a processor, some memory 34 and typically some I/O 35, and an interface to an interconnect device 32.

In contrast, in conventional computer networks which connect together several computer systems, a network protocol is used by the computer systems to communicate with a network through the network hardware, such as a Network Interface Card (NIC) and the network software which includes a network driver. Typically, a network operating system (NOS) is provided to coordinate the communications between the nodes of the computer network.

However, none of these prior art systems disclose that an internal or CPU bus, or a similar interconnect device, is addressed as a separate networking device so that the different processors in a multi-processor system communicate with each other using a network protocol. That is, none of the prior art discussed above, disclose the use of a network protocol to communicate between the processors of a multi-processor system in which the processors are connected to each other by a suitable interconnect device, such as a shared bus. Accordingly, none of the prior art discussed above suggests providing a network driver for the interconnect device so that the processors of a multi-processor system can communicate with each other through the interconnect device by using a standard network protocol.

SUMMARY OF THE INVENTION

Therefore, it is a general object of the invention to alleviate the problems and shortcomings identified above.

One of the objects of the invention is to provide a multi-processor computer system in which the processors communicate with each other through an interconnect device by using a network protocol.

Another object of the invention is to provide a multi-processor computer system in which the processors communicate with each other through a shared bus by using a network protocol.

Another object of the invention is to provide a multi-processor communication system in which the processors communicate with each other through a shared PCI bus by using the TCP/IP protocol.

A further object of the invention is to provide a multi-processor computer system in which the processors communicate with each other through a switched interconnect device by using a network protocol.

Another object of the invention is to provide a multi-processor computer system in which the processors communicate with each other through a switched interconnect device by using the TCP/IP protocol.

Another one of the objects of the invention is provide a method of communicating between the processors of a multi-processor system in which the processors communicate through an interconnect device by using a network protocol.

A further object of the invention is to provide a method of communicating between the processors of a multi-processor system in which the processors communicate through a shared bus by using a network protocol.

Another object of the invention is to provide a method of communicating between the processors of a multi-processor system in which the processors communicate through a switched interconnect device by using a network protocol.

A further object of the invention is to provide a method of communicating between the processors of a multi-processor system in which the processors communicate through an interconnect device by using the TCP/IP network protocol.

These and other objects are achieved by providing a multi-processor computer system which includes a plurality of computing cells, each of which comprises a processor, a memory and a network interface unit. The computing cells are connected together through an interconnect device. Each of the computing cells is provided with a network driver for the interconnect device so that the computing cells can communicate with each other through the interconnect device by using a network protocol, such as the TCP/IP network protocol.

Also provided is a method for communicating between the processors of a multiprocessor system which includes providing a plurality of computing cells, each containing a processor, a memory and a network interface unit; connecting the computing cells by using an interconnect device; and providing each computing cell with a network driver for the interconnect device so that the computing cells communicate with each other through the interconnect device by using a network protocol, such as the TCP/IP network protocol.

BRIEF DESCRIPTION OF THE DRAWINGS

The accompanying drawings, which are incorporated in and constitute a part of the specification, illustrate a presently preferred embodiment of the invention, and, together with the general description given above and the detailed description of the preferred embodiment given below, serve to explain the principles of the invention.

FIG. 6 is a flowchart showing the function logic performed by a Master cell's Bus Interface Unit (BIU).

DETAILED DESCRIPTION OF THE PREFERRED EMBODIMENT

Figure 1A:
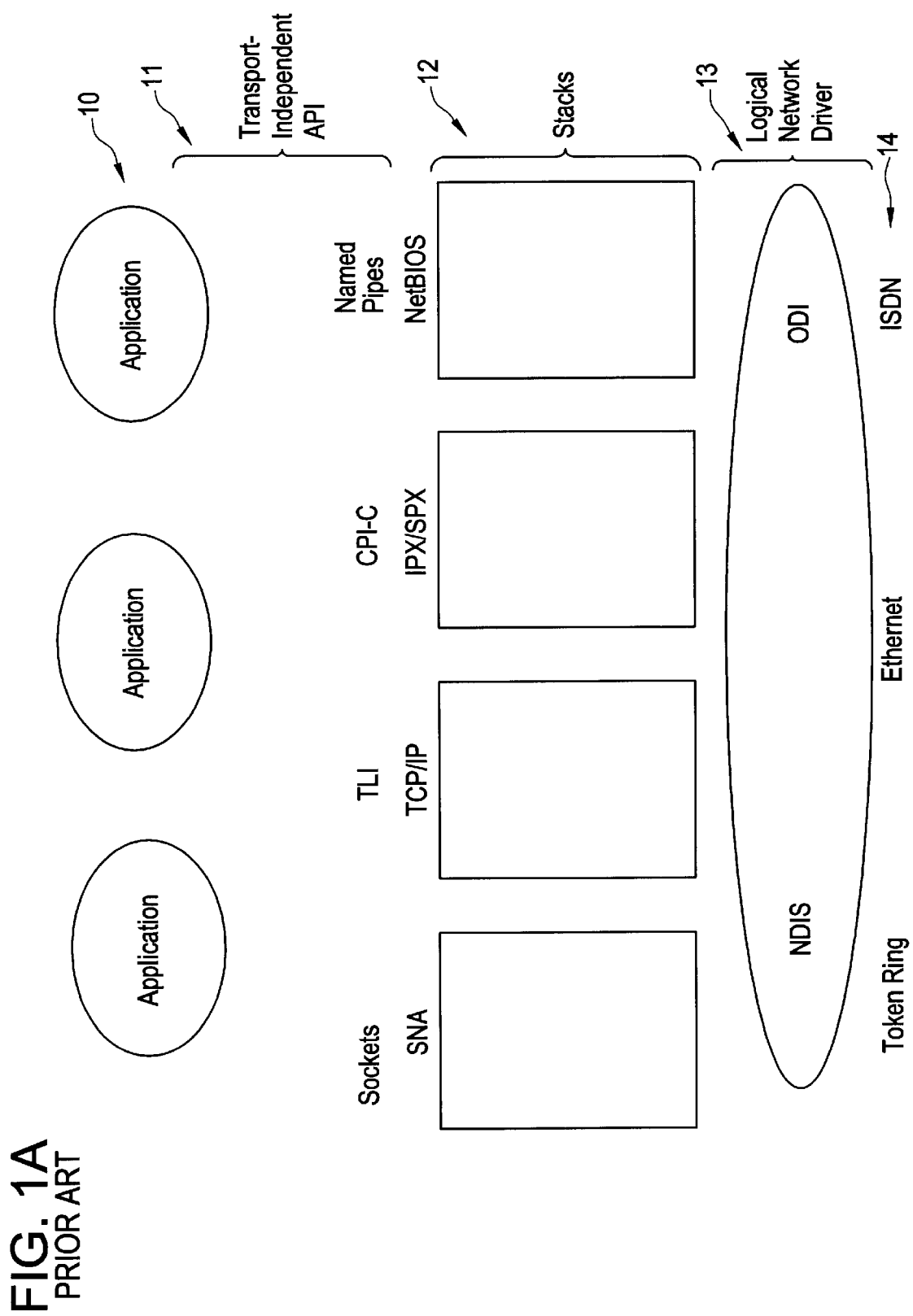
FIG. 1a is a diagram showing the interfaces to a network protocol stack.
Figure 1B:
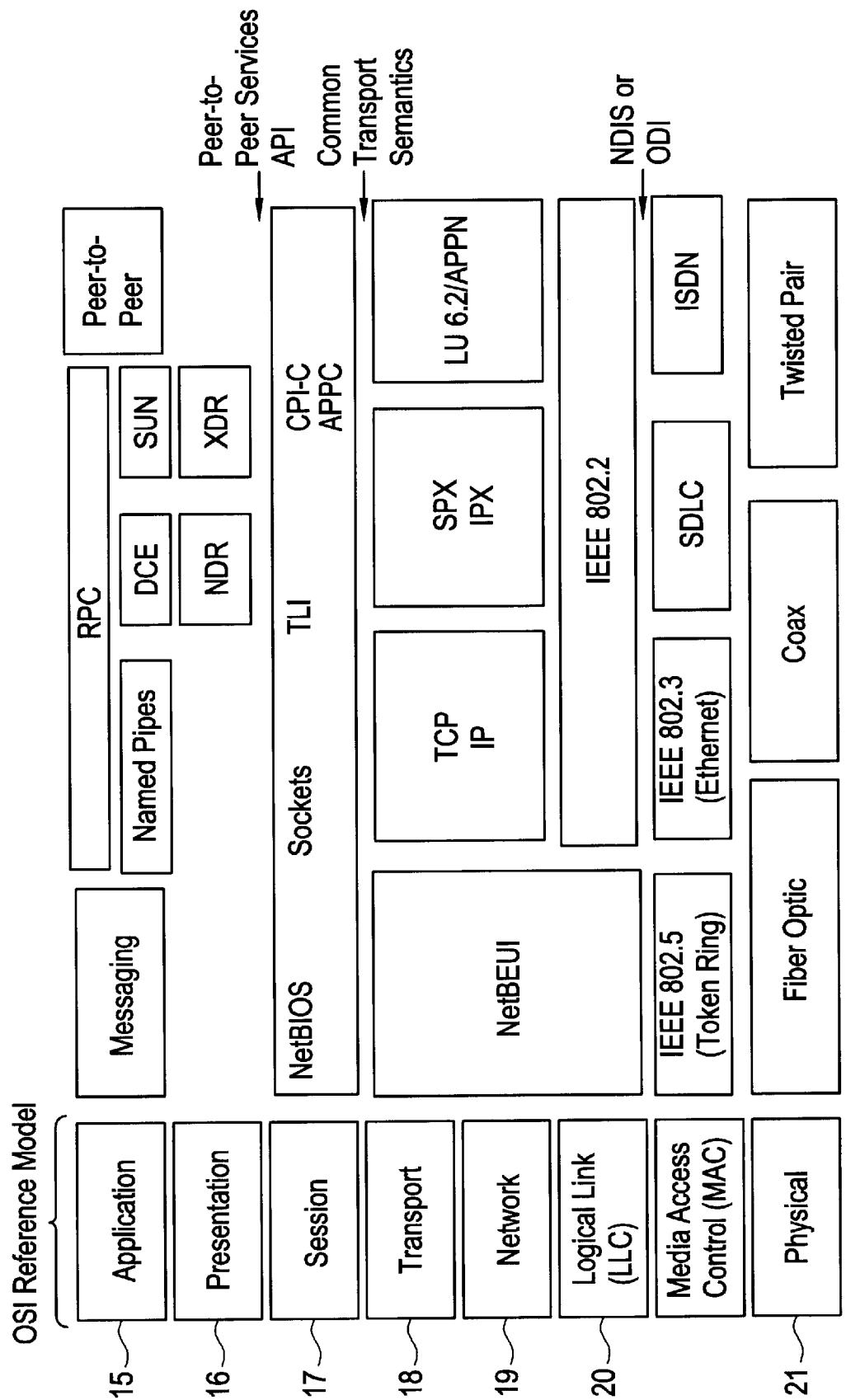
FIG. 1b is a diagram showing the OSI reference model describing the functional layers of a network protocol.
Figure 2:
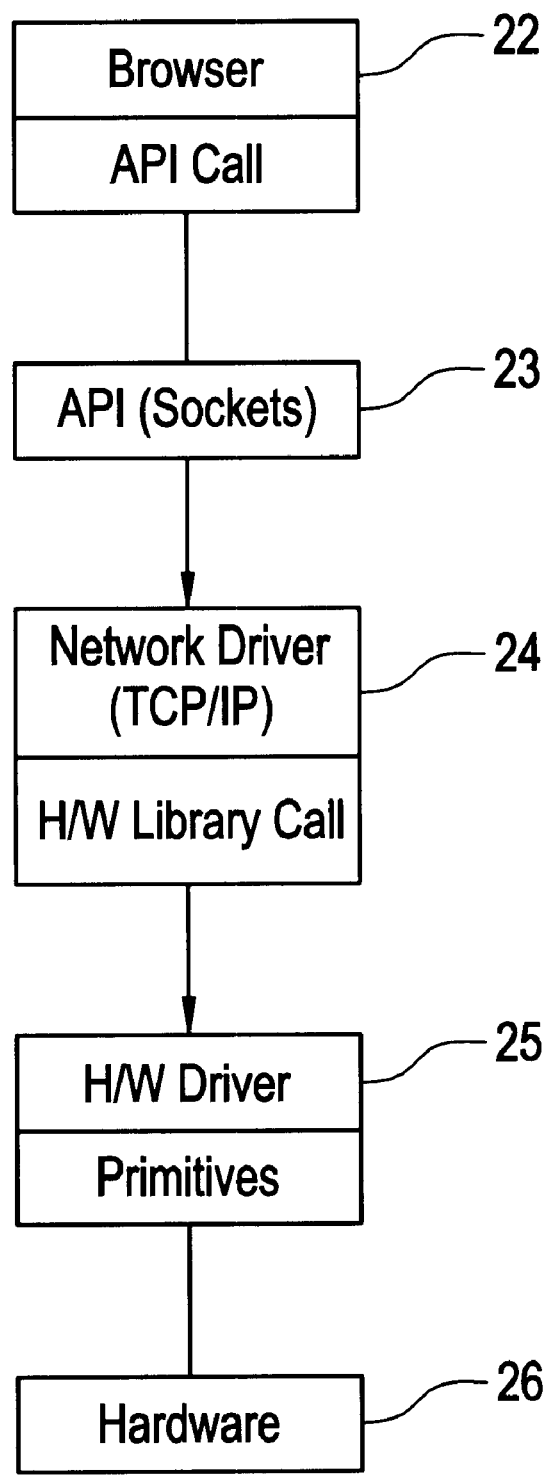
FIG. 2 is a diagram showing the network interface of a typical internet browser application.
Figure 3:
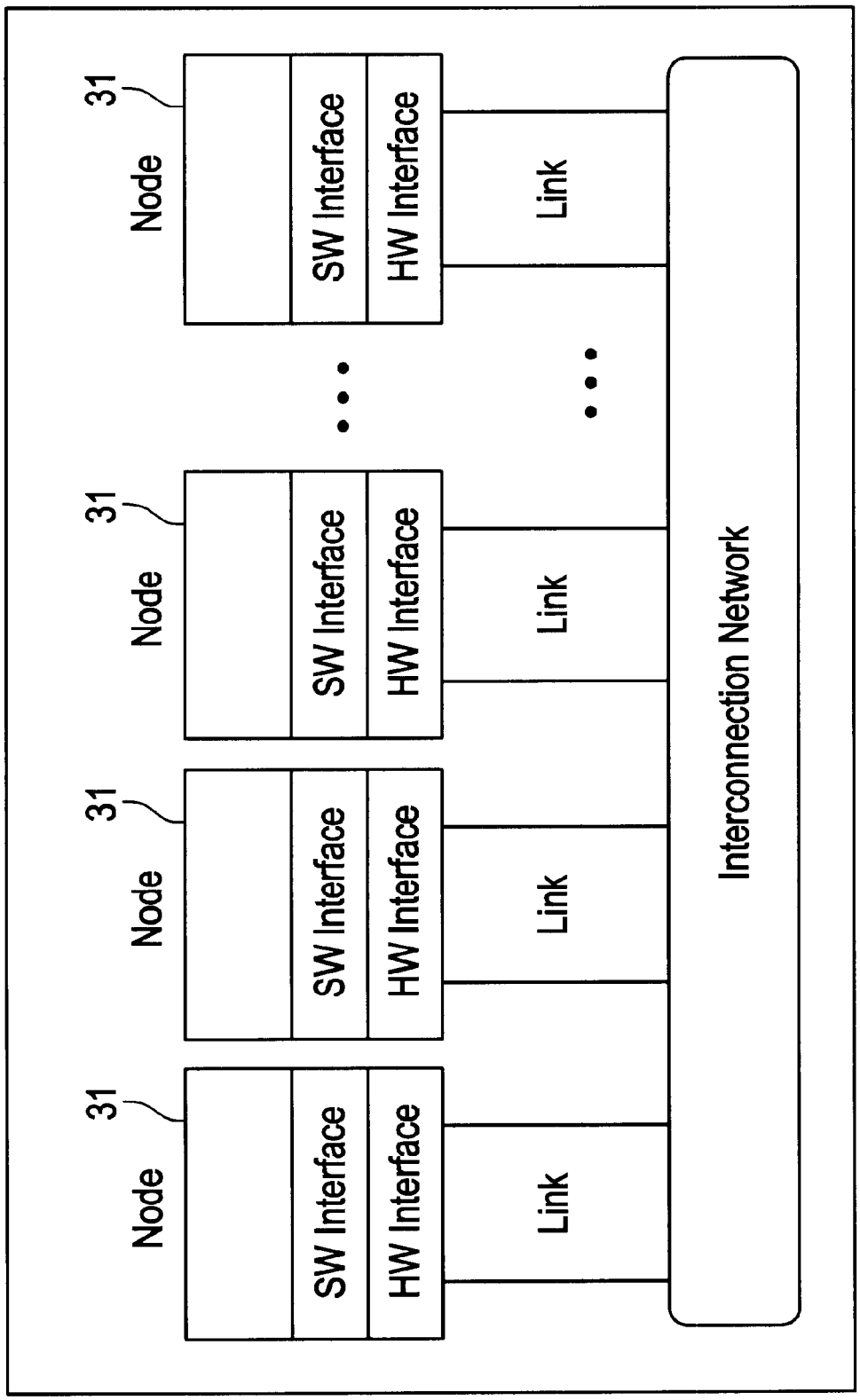
FIG. 3 is a diagram showing a generic interconnection network.
Figure 4:
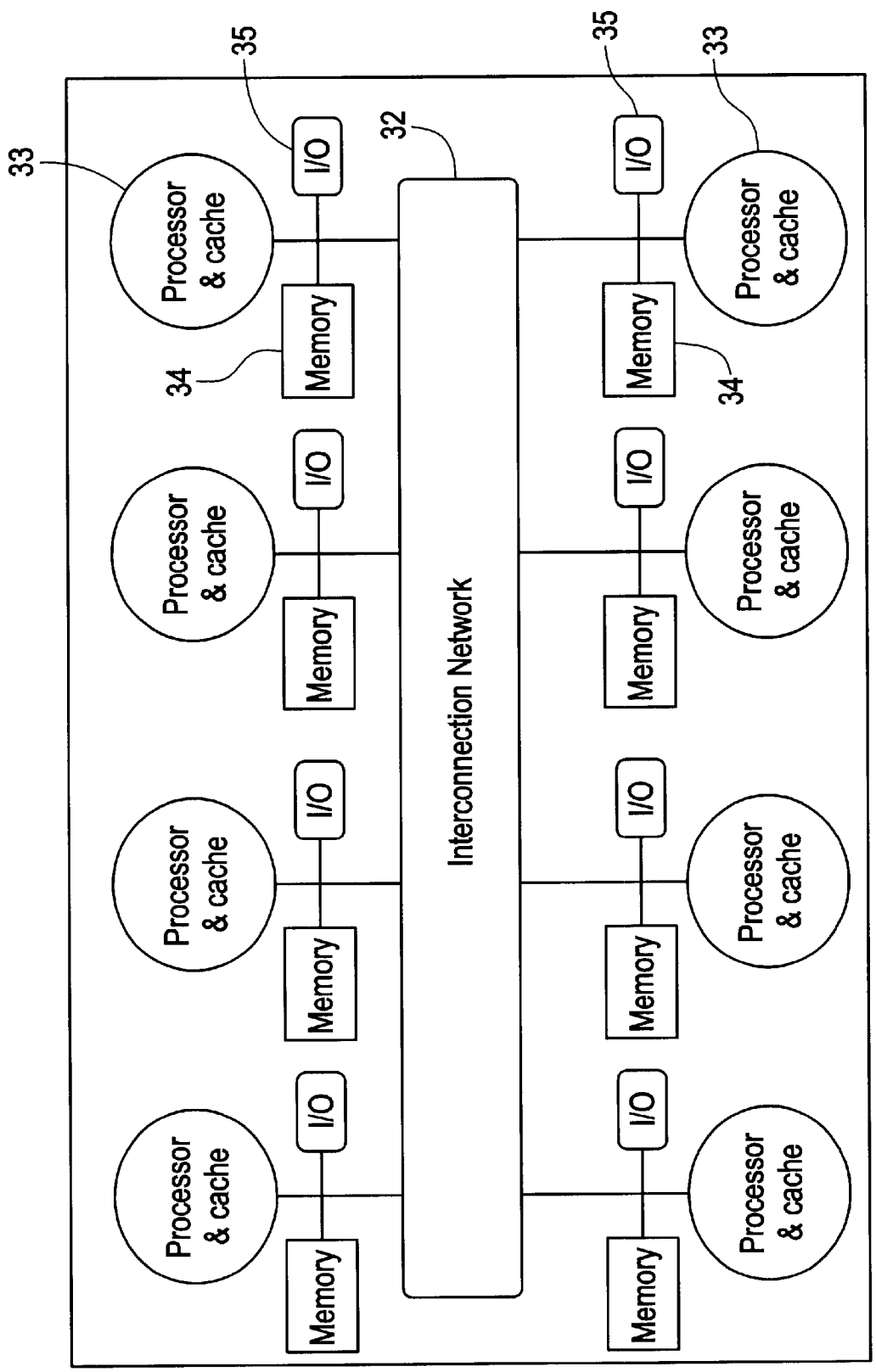
FIG. 4 is a diagram showing the architecture of a distributed memory multiprocessor system.

The present invention provides, in a general aspect, a multi-processor computing system which includes several computing cells, each of the computing cells including a processor, a memory and a network interface unit. An interconnect device connects the computing cells. The computing cells are provided with a network driver for the interconnect device so that the computing cells communicate with each other through the interconnect device by using a network protocol, such as the TCP/IP network protocol.

In another general aspect, the present invention provides a method for communicating between the processors of a multi-processor system which includes providing a plurality of computing cells, each of which contain a processor, a memory and a network interface unit. A connecting step connects the computing cells to each other by providing an interconnect device. A further providing step provides each of the computing cells with a network driver for the interconnect device so that the computing cells communicate with each other through the interconnect device using a network protocol, such as the TCP/IP protocol.

Therefore, the present invention provides a configuration in which the internal bus is configured and defined as network hardware on which the messages can travel through from one processor to another. In a manner similar to network hardware, such as an ethernet hardware card, the lowest layer of the network drivers are programmed so that they can recognize and communicate with the internal bus or a similar interconnect device as a network device.

Programming a network driver so that it can communicate with an internal bus or a similar interconnect device is within the capabilities of one skilled in the art. For example, details of programming a network driver in the Linux environment is provided on the Internet at URL http://www.linuxdoc.org/HOWTO/Ethernet-HOWTO-8.html#ss8.2. A copy of the document is attached to the present application as Appendix A and is incorporated herein in its entirety. All rights with respect to Appendix A belong to the copyright holders in accordance with the copyright permission under paragraph 5 which is also included in Appendix A.

One implementation of such a network driver, for example, in a TCP/IP implementation, could be software programmed to intercept the IP packets after they are formed and before they are transmitted to the network through the network interface hardware. The specially programmed software would then determine if the IP address specified one of the other processors of the multi-processor system and if so, route the packet to the appropriate processor through the internal bus or other interconnect device. If the specially programmed software determined that the IP address did not belong to one of the other processors, the IP packet would then be routed for onward transmission to the network through the network interface hardware in the usual manner. Details of exemplary techniques by which the software could route the IP packets from one processor to another are provided further herein. As an example, in a multi-processor Windows NT environment, inter-task messaging could be used to transfer the data between the different processors.

Figure 5A:
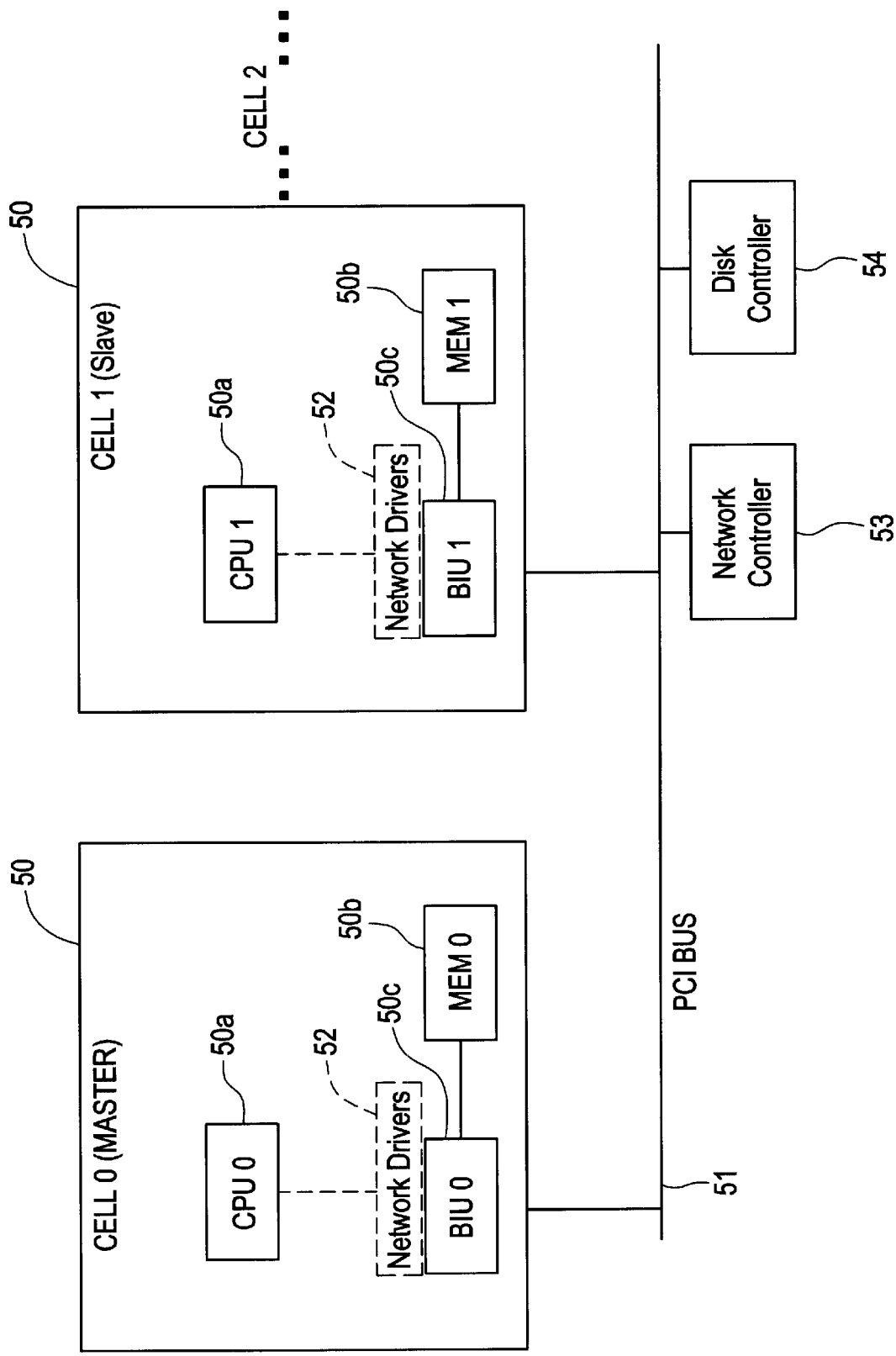
FIG. 5a is a block diagram showing the system configuration according to a preferred embodiment of the present invention.

FIG. 5a is a block diagram showing the system configuration according to a preferred embodiment of the present invention. The system is provided with several computing cells 50, each of which comprises conventional computer components such as a CPU and a memory unit. Each cell is attached to a PCI Bus 51, an industry standard I/O bus. Each cell communicates with each other by using a network protocol through the shared bus 51. For example, the network protocol used to communicate over the bus could be the TCP/IP protocol.

As shown in FIG. 5a, the multi-processor system comprises two of more computing cells 50, attached by a PCI Bus 51. Each cell 50 contains a CPU 50a, a memory unit (MEM) 50b, and a Bus Interface Unit(BIU) 50c. One of the cells, cell 0 is called a master cell 50 ("Master"), and all the other cells are called slave cells 50 ("Slave"). Each BIU 50c has an interface to the PCI Bus 51. The Master cell's BIU 50c (BIU0) is an ordinary PCI bus interface LSI. An example of such an LSI is Intel Corporation's 430TX LSI. Details of this LSI are provided by several Intel publications and is also available at their website at the following address (URL):

http://developer.intel.com/design/chipsets/mature/430tx/index.htm.

In addition, each of the cells 50 is provided with a programmed network driver 52 that recognizes and communicates with the CPU bus (such as a PCI bus) 51 as a network device such that the CPU bus 51 can be used as a communication medium by networking software implementing a standard network protocol, such as the TCP/IP network protocol.

The Slave cells' BIU 50c (such as BUI1) are also similar to a conventional PCI bus interface LSI, with the following additional functions of memory aliasing and Direct Memory Access (DMA). Preferably, the CPUs have at least a 32 bit data path and 32 bit addressing capability.

In addition, the PCI bus 51 may have additional hardware attached to it. This additional hardware can include, for example, disk controllers 54 for the master cell to access the disk drives, and network controllers 53, such as an ethernet controller, for the master cell to communicate with other systems or networks.

For purposes of this application, memory in one's own cell is referred to as "local memory." Memories in other cells, including the memory in the master cell, are referred to as "remote memory."

Figure 5B:
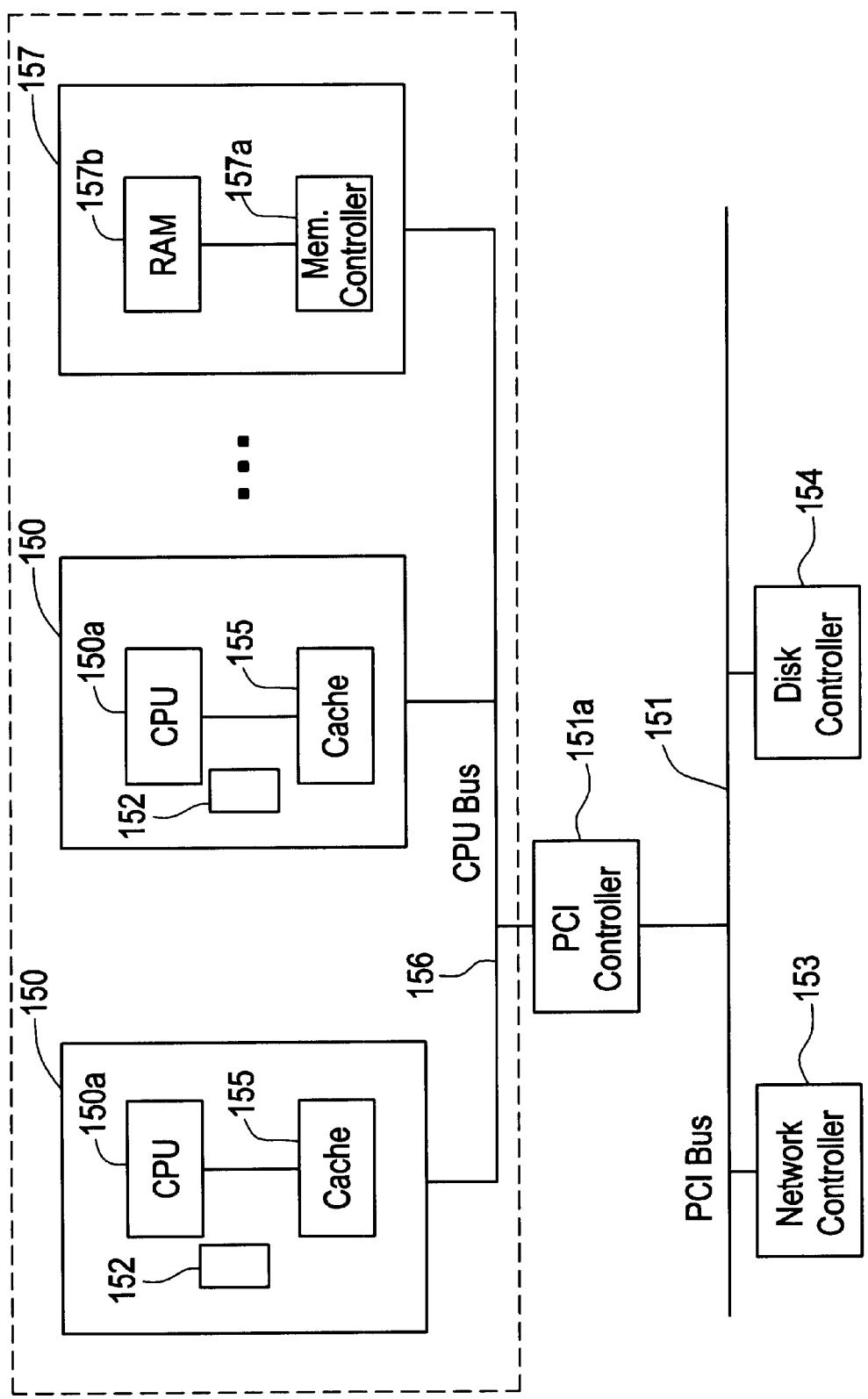
FIG. 5b is a block diagram showing the system configuration according to an alternate embodiment of the present invention.

FIG. 5b shows an alternative embodiment in which a sub-cell 150 includes a CPU 150a and a cache 155. Each of the sub-cells 150 are connected to a CPU Bus 156 which is also connected to a shared memory unit 157 which includes the shared memory 157b and a memory controller 157a. The CPU Bus 156 is in turn interconnected with a PCI Bus 151 through a PCI Controller 151a. This configuration of sub-cells 150 together with the shared memory 157 (shown in the FIG. 5b within dotted lines) correspond to the cell 50 of the embodiment shown in FIG. 5a. Therefore, these groups of sub-cells 150 can then connected together using a PCI Bus 151 in the same manner as the cells 50 of FIG. 5a are connected together using the PCI Bus 51. Likewise, the PCI Bus 151 can then be connected with other external devices, for example, through a network controller 153 and a disk controller 154. In this configuration, the programmed network driver software 152 could be programmed so that each of the processors 150a is able to communicate with the other processors in the same group of sub-cells by using a network protocol via CPU bus 156. Furthermore, the processors 150a would also be able to communicate with the processors 150a that belong to other groupings of sub-cells 150.

As discussed earlier, this specially programmed network driver can be programmed in several ways that are within the abilities of one skilled in the art. In one such implementation, the programmed network driver software could be implemented to intercept the IP packets in a TCP/IP implementation so that IP packets addressed to one of the other processors are transmitted over the shared CPU Bus 156 and/or the PCI Bus 151 instead of being sent out to the network through the network interface hardware.

FIGS. 6–11 provide an exemplary scheme for the transfer of data between the cells disclosed in FIG. 5a which are connected by a shared bus or a similar interconnect device. In this exemplary scheme, FIG. 6 is a flowchart showing the functions performed by a Master BIU. The Master BIU manages requests from both its CPU and the PCI bus.

In step 605, the master BIU determines if the request received is a CPU request and if so, proceeds to step 610. In step 610, the master BIU checks if the address of the CPU request is smaller than maximum installed memory 50b, and if so, the request is directed to the memory of the master cell in step 615. However, if the address of CPU request is greater than maximum installed memory in step 610, the request is directed to the PCI bus in step 620.

If in step 605, the BIU determines that the request is not a CPU request, it proceeds to step 625 to determine if it is a PCI request. If it is determined to be a PCI request, the BIU proceeds to step 630 to determine if the address of PCI request is smaller than a maximum installed memory. If so, the request is directed to master cell memory 50b in step 640. If not, that is, if the address of PCI request is greater than maximum installed memory, it is then directed to internal registers of the master cell in step 635.

Figure 7:
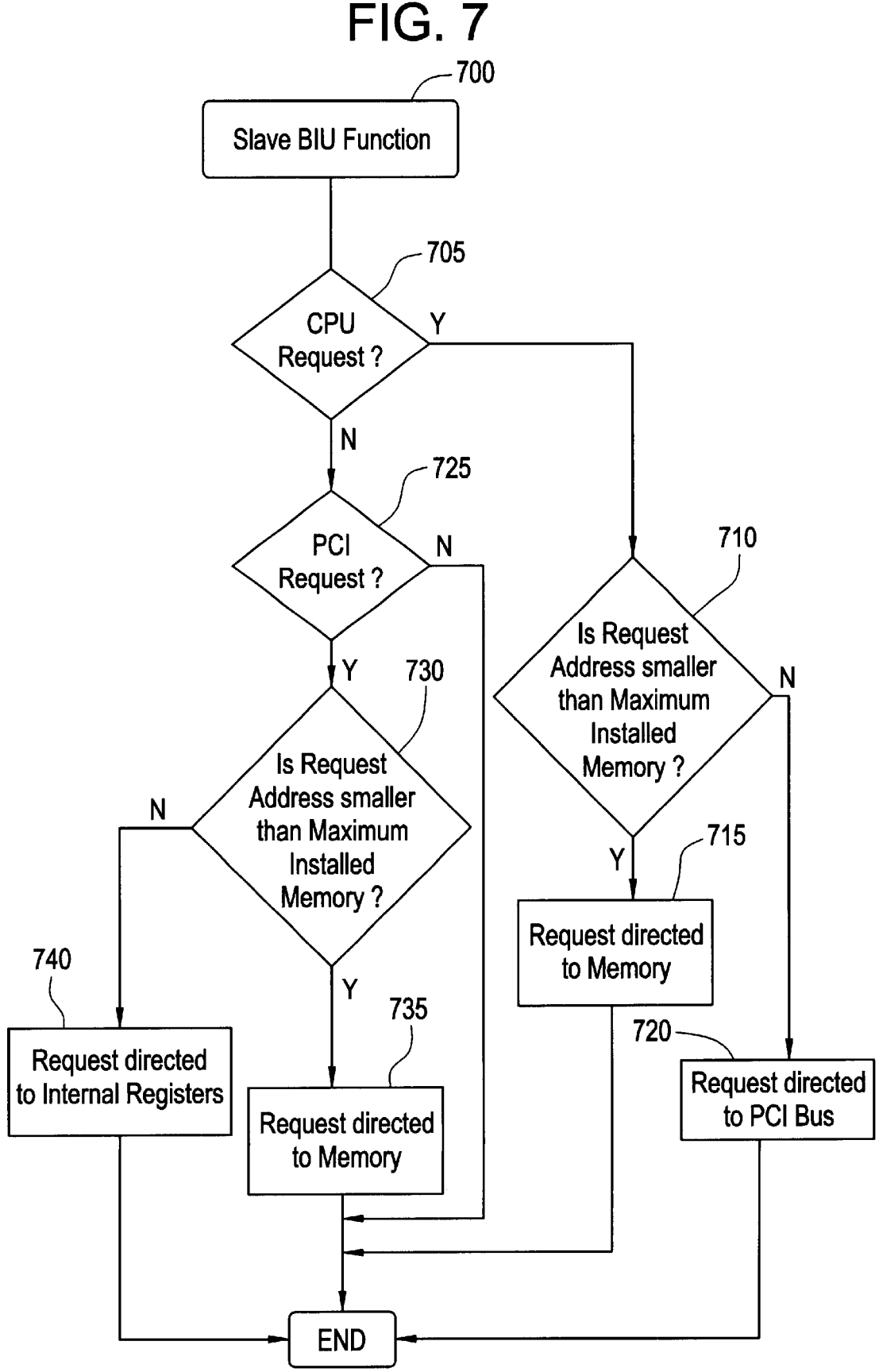
FIG. 7 is a flowchart showing the function logic performed by a slave cell's BIU.

FIG. 7 is a flowchart showing the functions performed by a Slave BIU. A Slave BIU manages requests from the slave CPU, the DMA module inside the BIU and from the PCI bus. In step 705, the BIU determines if the request is a CPU request. If so, the BIU determines if the requested address is smaller than the maximum installed memory in slave cell in step 710. If the request address is smaller than the maximum installed memory, the request is directed to the local memory within the slave cell at step 715. If not, the request is directed to the PCI bus at step 720.

If the determination in step 705 is that the request is not a CPU request, the BIU proceeds to step 725 to determine if the request is a PCI request. If so, the BIU proceeds to step 730 to determine if the address of the PCI request is smaller than a maximum installed memory. If so, the request is directed to the local memory at step 735. If not, that is, if the address of PCI request is greater than the maximum installed memory, the request is directed to the internal registers of the slave cell at step 740.

Figure 8:
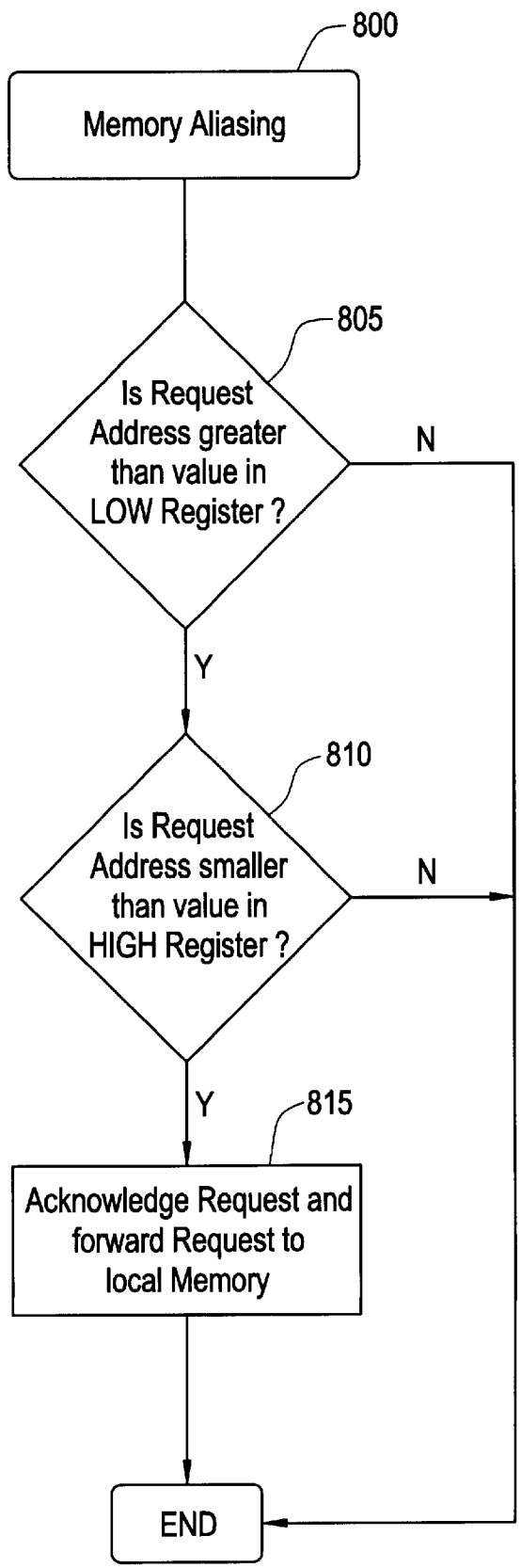
FIG. 8 is a flowchart showing the steps of the memory aliasing function.

FIG. 8 is a flowchart showing the steps of the memory aliasing function performed in the multi-processor system of the present invention. As discussed above, CPU requests are directed to either the local memory or to the PCI Bus. If the address of a request is lower than the highest address of installed memory, the request is directed to the local memory. If the address of request is higher than the highest address of installed memory, the request is directed to the PCI Bus. The lowest part of the PCI Bus address space is assigned to the memory space of a master cell, such as the master cell 50 (Cell 0) shown in FIG. 5a.

To enable access to memories in other slave cells in the system, the "Aliasing" technique is also employed. "Aliasing" allows each cell access to other cells' memory by accessing the PCI Bus address space. Predefined addresses in the PCI Bus are mapped to memories in the cells. Each cell has a different base address in the PCI Bus address space. For example, with reference to FIG. 5a, Address 0xa0000000 (0x is prefix to denote hexadecimal number) in the PCI address space is mapped to address 0x00000000 of memory of Cell 0, address 0xa1000000 in PCI bus address space is mapped to address 0x00000000 of memory of Cell 1, and address 0xa2000000 in the PCI bus address space is mapped to address 0x00000000 of memory of Cell 2, and so on.

Each BIU has two registers which specify the highest address and the lowest address which may pass through from the PCI bus to the BIU's corresponding cell's memory. These registers are called, for example, the HIGH and LOW registers. Each BIU monitors bus transactions on PCI Bus. With reference to FIG. 8, if the BIU finds an access request to an address which falls within the range specified by the HIGH and LOW registers, as shown in steps 805 and 810, the BIU acknowledges the transaction and forwards the transaction to its local memory in step 815. The address ranges specified by HIGH and LOW registers in each of cells' BIU's should not overlap. The values stored in the HIGH and LOW registers are initialized by the system at boot-up time.

The present invention also provides a DMA module in each of the slave cells. The DMA modules manage data transfer requests between the master cell's memory (remote memory) and the memory a slave cell (local memory). There are several states (i.e. registers) for controlling this transfer. These registers are accessed by memory mapping. For example, the following registers can be provided.

STATUS register: this 32 bit register provides status of transfers which the DMA is handling. This register also provides error information.

SRC register: this 32 bit register holds the starting address of a local address block to be transferred to or from the master memory block.

DST register: this 32 bit register holds the start address of a remote address block to be overwritten with the local memory block being transferred.

LEN register: this 32 bit register behaves differently depending on whether it is being read or written to. Writing to this register initiates a transfer using SRC and DST, and then the written data specifies the transfer length. Reading this register captures the remaining length of an ongoing data transfer.

These registers are memory mapped on predetermined PCI bus address spaces, i.e. each cell can access these registers by reading from and writing to the appropriate respective addresses on the PCI bus.

The data transfer operations in the present system are described next. As discussed earlier, the most primitive operation between cells regarding network communication is the sending operation. There are, however, three types of sending operations depending on the combination of the originating cell and the receiving cell in terms of the data transfer. These data transfer operations are: (i) Master to Slave; (ii) Slave to Master; and (iii) Slave to Slave. Each of these three types of send operations are discussed next.

Master to Slave Transfer

Figure 9:
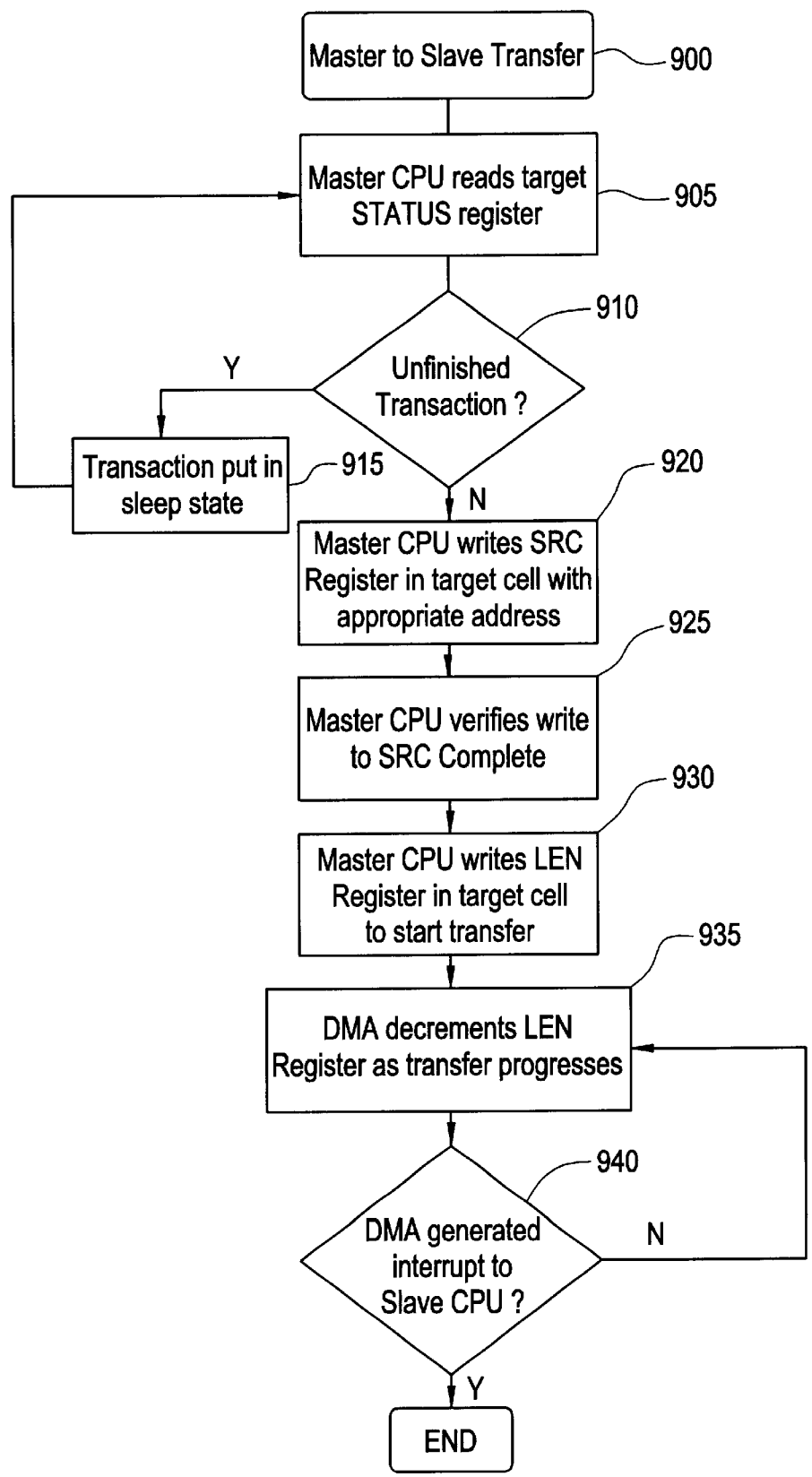
FIG. 9 is a flowchart showing the steps in a data transfer from a master cell to a slave cell.

As described in the flowchart of FIG. 9, the following steps are followed when a 10 data block in a Master's memory is transferred by the DMA module in a destination Slave's BUI. In step 905, the master CPU reads the STATUS register in the target slave cell to determine if there are any unfinished transactions. If, in step 910, the determination is made that there is an unfinished transaction, the current transaction is put in a sleep state in step 915 for a predetermined time before steps 905 and 910 are repeated again. However, if response data from the STATUS register in step 910 indicates that the DMA in the target cell is ready to initiate a new transfer, the Master CPU writes to the SRC register in the target cell with an appropriate address in step 920. Thereafter, the master CPU verifies that the write to the SRC register was successful in step 925. If so, the master CPU proceeds to step 930 to write to the LEN register in the target cell to initiate the transfer.

The DST register is not written into at this time because the DST register is set by the Slave CPU at initialization. It is the Slave's responsibility to ensure that the destination data buffer in the memory is ready when the STATUS register indicates that the DMA module is ready to initiate a new transfer.

In step 935, during the transfer, the DMA module periodically decrements the LEN register as the transfer progresses. When LEN register reaches 0 (zero), the DMA generates an interrupt to the Slave CPU in step 940 to terminate the transfer and reinitialize the DMA module for a new data transfer.

Slave to Master Transfer

Figure 10:
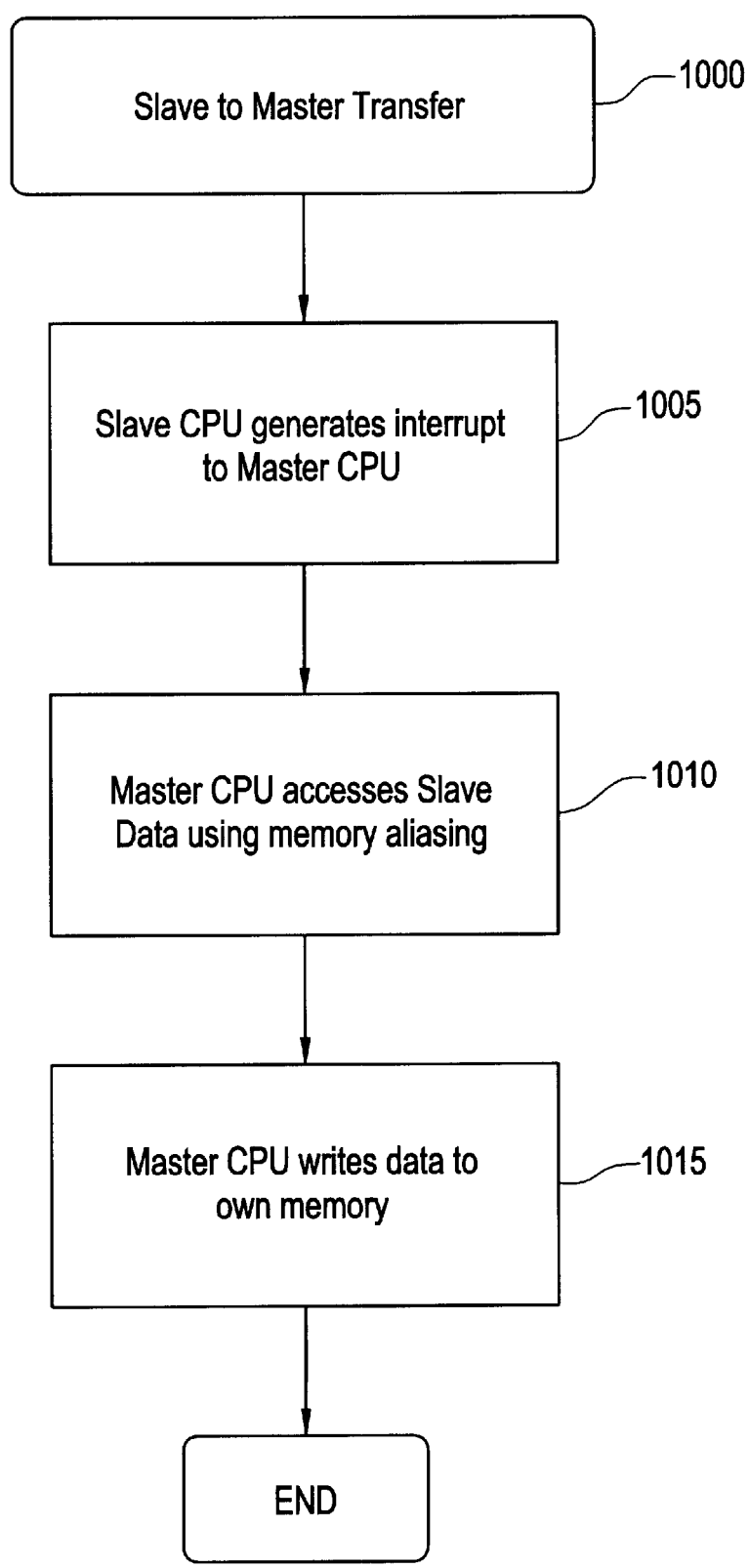
FIG. 10 is a flowchart showing the steps in a data transfer from a slave cell to a master cell.

As shown in the flowchart of FIG. 10, the following steps are involved in the data transfer of a data block in a Slave's memory that is transferred to the master's CPU, i.e. CPU0. The transfer is initiated by a slave CPU generating an interrupt to the master CPU at step 1005. Upon receiving the interrupt, the master CPU reads the data from the slave's memory block by accessing the memory aliasing area in the PCI bus in step 1010. Thereafter, in step 1015, the master CPU writes the data to its own memory to complete the data transfer from the slave cell to the master cell.

Slave to Slave Transfer

Figure 11:
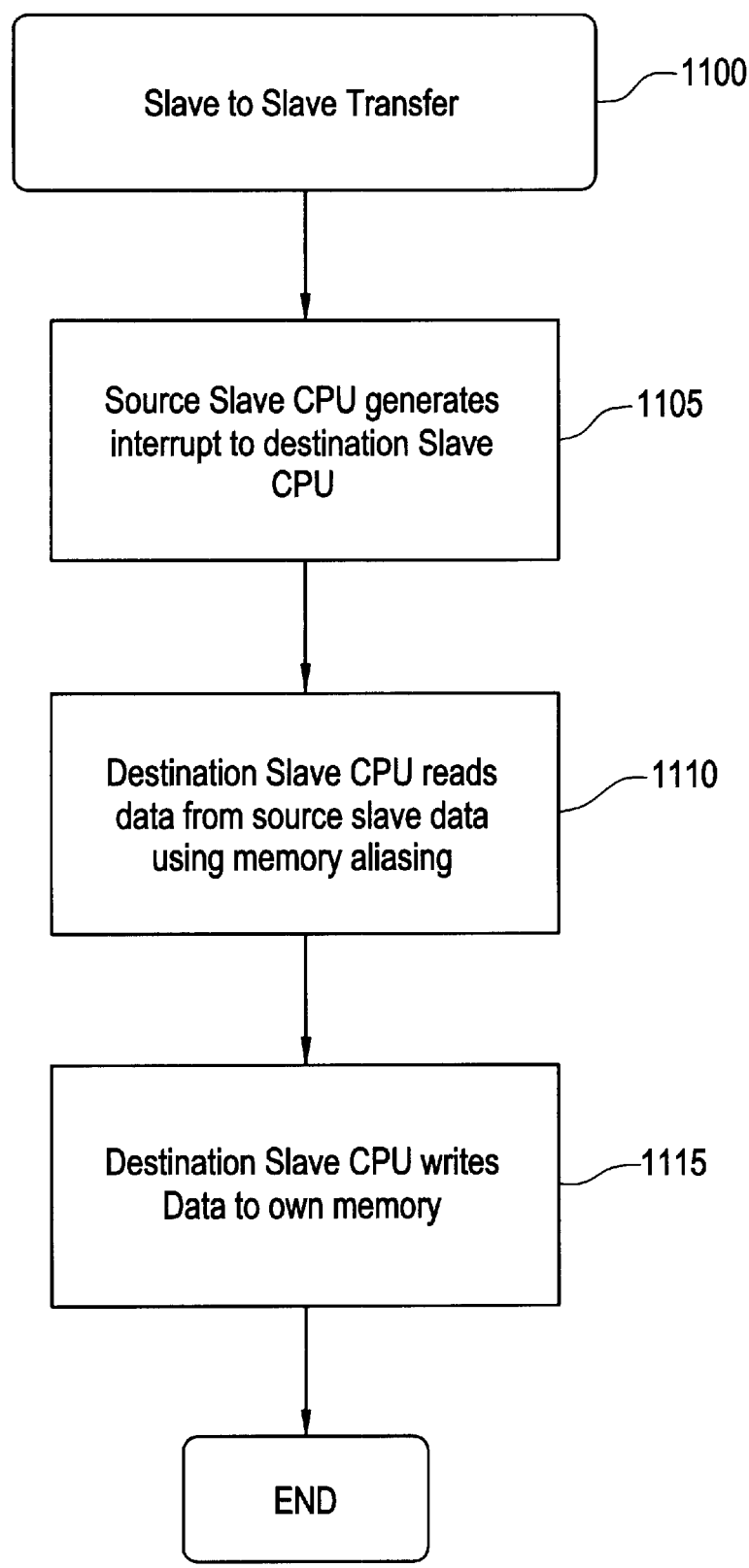
FIG. 11 is a flowchart showing the steps in a data transfer from a slave cell to another slave cell.

As shown in the flowchart of FIG. 11, the following steps are performed when a data block in a source slave's memory is transferred to a destination slave's CPU. In step 1105, the source slave's CPU generates an interrupt to the destination slave's CPU. In step 1110, the destination slave's CPU reads data from the source slave's memory block by accessing the memory aliasing area in the PCI bus. Thereafter, in step 1115, the destination slave's CPU writes the data to its local memory to complete the slave-to-slave data transfer.

Figure 12:
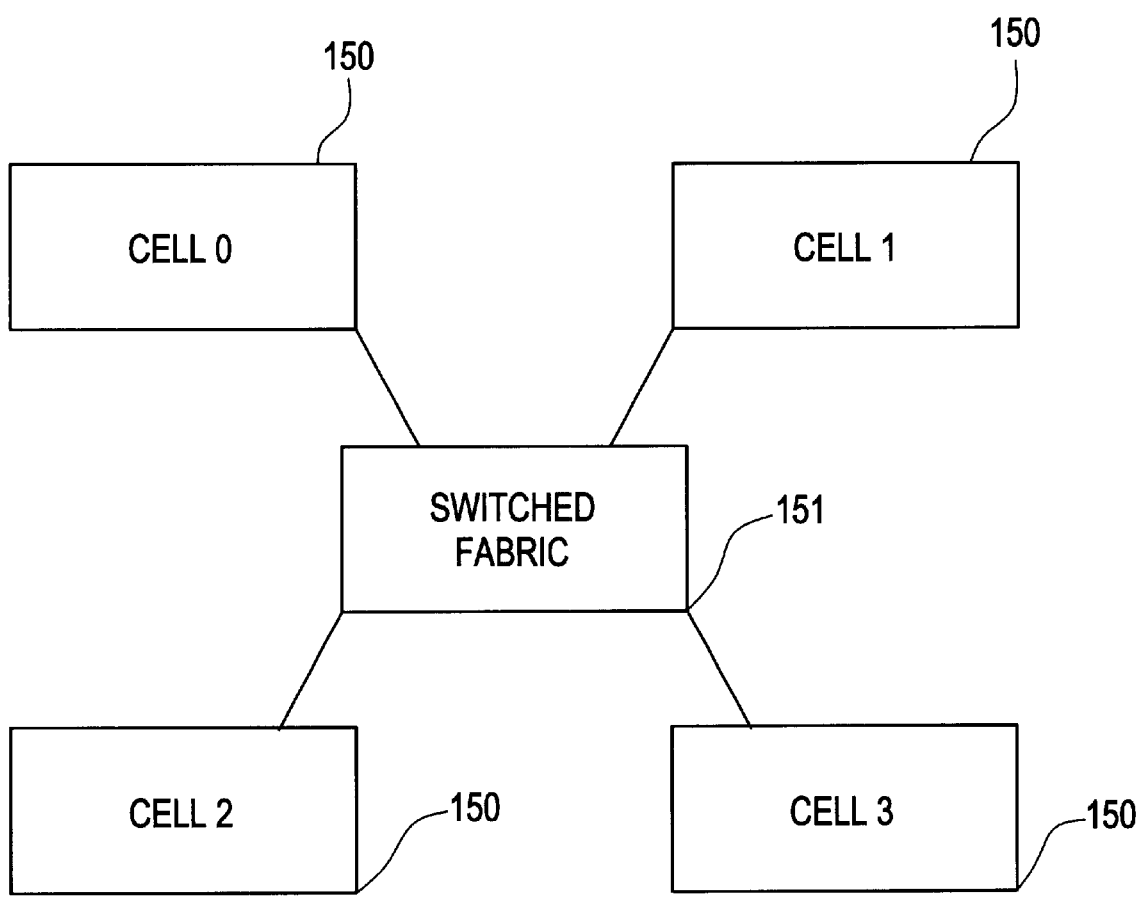
FIG. 12 is a block diagram showing the system configuration according to another embodiment of the present invention.

A second embodiment of the present invention uses a connection scheme between the cells that uses a point-to-point connection rather than a shared bus. Therefore, the cells 150 can be connected, for example, by a switched fabric 151 as shown in FIG. 12. Examples of such a switched fabric 151 include, for example, a crossbar network, a multistage switch network, or a time division shared bus.

In this connection scheme, a data transfer transaction can be defined by the following exemplary data items: source address (Cell: Memory), destination address (Cell: Memory), transfer type and actual data.

For example, to send a message from cell 0 to cell 3, a transaction travelling through the switched fabric can be provided with the following exemplary data values:

Source address: Cell 0: 0x00a00000

Destination address: Cell 3: 0x00040000

Type: Write

Data:

In some situations, this data transfer can be effected more easily than in the embodiment that uses the shared bus communication scheme.

Other embodiments of the invention will be apparent to those skilled in the art from a consideration of the specification and the practice of the invention disclosed herein. It is intended that the specification be considered as exemplary only, with the true scope and spirit of the invention being indicated by the following claims.

I claim:

1. A multi-processor computer system comprising:

a plurality of computing cells, each of the computing cells comprising a processor, a memory, and an interface unit; and an industry standard shared Input-Output (I/O) bus that interconnects the plurality of computing cells using the interface units, wherein each of the computing cells are provided with a network driver which recognizes and communicates with the industry standard shared Input-Output (I/O) bus as a network device, and communicate with each other through the industry standard shared Input-Output (I/O) bus by using a network protocol.

2. The system according to claim 1, wherein the industry standard shared I/O bus is a PCI bus.

3. The system according to claim 1, wherein the industry standard shared I/O bus is a time division shared bus.

4. The system according to claim 1, wherein the network protocol is the TCP/IP protocol.

5. A method of communicating between processors of a multiprocessor system, comprising the steps of:

providing a plurality of computing cells, each containing a processor of the multiprocessor system, a memory, and an interface unit;

connecting the computing cells by using an industry standard shared Input-Output (I/O) bus;

providing each of the computing cells with a network driver which recognizes and communicates with the industry standard shared Input-Output (I/O) bus as a network device; and wherein each of the computing cells communicate with each other through the industry standard shared Input-Output (I/O) bus by using a network protocol.

6. The method according to claim 5, wherein the industry standard shared I/O bus is a PCI bus.

7. The method according to claim 5, wherein the industry standard shared I/O bus is a time division shared bus.

8. The method according to claim 5, wherein the network protocol is the TCP/IP protocol.

9. A method of communicating between processors of a multiprocessor system, comprising the steps of:

providing a plurality of computing cells, each containing at least a processor of the multiprocessor system, a memory, and an interface unit;

connecting the computing cells using an industry standard shared Input-Output (I/O) bus;

configuring and defining the industry standard shared Input-Output (I/O) bus as network hardware; and using a network protocol to transmit data between the processors of the computing cells through the industry shared Input-Output (I/O) bus.

10. The method according to claim 9, further comprising the step of providing a PCI bus as the industry standard shared I/O bus.

11. The method according to claim 9, further comprising the step of providing a time division shared bus as the industry standard shared I/O bus.

12. The method according to claim 9, further comprising the step of using the TCP/IP protocol as the network protocol.

* * * * *